United States Patent [19]

Kluger et al.

[11] Patent Number: 5,620,116
[45] Date of Patent: Apr. 15, 1997

[54] ROTARY VANE GATE

[75] Inventors: Wolfgang Kluger, Beckum; Klaus Schwab, Dinker; Andreas Franz, Rheda-Wiedenbruck; Dieter Quittek, Ahlen; Bernd Köllner, Beckum, all of Germany

[73] Assignee: Krup Polysius AG, Beckum, Germany

[21] Appl. No.: 372,391

[22] Filed: Jan. 13, 1995

[30] Foreign Application Priority Data

Feb. 23, 1994 [DE] Germany ............................ 44 05 828.4

[51] Int. Cl.$^6$ ................................................ G01F 11/10
[52] U.S. Cl. ...................................................... 222/368
[58] Field of Search ............................................... 222/368

[56] References Cited

U.S. PATENT DOCUMENTS

| | | | |
|---|---|---|---|
| 3,895,745 | 7/1975 | Hook | 222/368 |
| 4,784,298 | 11/1988 | Heep et al. | 222/368 X |
| 4,946,078 | 8/1990 | Heep et al. | 222/368 |
| 5,381,933 | 1/1995 | Beirle | 222/368 |
| 5,392,964 | 2/1995 | Stapp et al. | 222/368 |
| 5,480,268 | 1/1996 | Smoot | 222/368 X |

FOREIGN PATENT DOCUMENTS 2419841  7/1977  Germany .

*Primary Examiner*—Kevin P. Shaver
*Attorney, Agent, or Firm*—Learman & McCulloch

[57] ABSTRACT

The invention relates to a rotary vane gate for free-flowing bulk material and Comprises a housing provided with housing covers on the end faces as well as with an inlet opening and an outlet opening and a compartmentalised wheel disposed in the housing with a rotatably mounted drive shaft, the wheel having compartments which are axially delimited by limiting plates 11. With a view to a construction which is particularly resistant to pressure shocks and is safe against penetration of flames, a sealed wear plate is provided between each limiting plate of the wheel and the neighbouring housing cover and at least one bypass chamber is provided between this wear plate and the limiting plate. The axial internal width of the inlet opening corresponds at most to the axial internal width of the compartments and the axial internal width of the outlet corresponds approximately to the overall length of the wheel including the bypass chambers.

7 Claims, 4 Drawing Sheets

ROTARY VANE GATE

The invention relates to a rotary vane gate for free-flowing bulk material.

BACKGROUND OF THE INVENTION

Rotary vane gates of the type to which the invention relates serve above all for dosaging free-flowing bulk materials and/or for introducing (charging) such bulk materials into pneumatic conveying lines when the spaces above the inlet opening and below the outlet opening are subjected to different pressures.

Various types of rotary vane gates are generally known in the art in which a compartmentalised wheel which can be driven in rotation and can be open or closed on its end faces is received in a housing which is largely closed—up to the inlet opening and outlet opening. In the case of rotary vane gates, or the compartments which are formed therein, which are open on the end faces, during the rotary movement of the wheel and thus on the way from the inlet to the outlet opening the bulk material comes into contact with the inner faces of the housing cover on the end faces, so that in the case of abrasive bulk material a considerable wear by abrasion is caused. After a relatively short time this wear proves particularly disadvantageous in the case of rotary vane gates which are subjected to comparatively high pressure differences and/or in which it is necessary to ensure a relatively high resistance to pressure shocks or safety against penetration of flames (because of bulk materials, e.g. coal dust, which have a tendency to explode).

A known rotary gate is disclosed in DE-B-24 19 841 as one in which the wheel and thus also the compartments formed therein is delimited by end faces or end plates. In this case a space is formed at each end between the end face and the neighbouring housing cover, and continuously pressurised clean air is introduced by way of a branch line as scavenging air into this space, this air being intended to flow on the one hand through the gaps between the circumference of the wheel and the housing in the direction of the inlet and on the other hand through the space and an outlet gap provided in the lower region into the Mate outlet. In this way the occurrence of leakages and the penetration of material for conveying into the said spaces should be prevented as thoroughly as possible on the other hand, however, the spaces should be continuously scavenged so that any dust penetrating into them can be drawn off into the gate outlet.

Thus in the known construction described above special line connections together with connecting arrangement and pressure monitoring and adjusting instruments are necessary at corresponding expense for the delivery of scavenging air into the two spaces. Moreover, however, it has also been shown in the art that in the case of many bulk materials it is not always possible entirely to prevent quantities of dust from becoming attached on the inner faces of the spaces which can gradually build up into such thick layers that because of the end faces of the wheel rotating relative to the fixed housing covers not only does an undesirable abrasion take place but the necessary rotary driving moment for the wheel increases in such a way that the wheel locks in the housing after a certain time.

The object of the invention, therefore, is to avoid the described disadvantages of the known constructions and to provide a rotary vane gate which has a relatively simple construction and is distinguished by a far-reaching avoidance of wear by abrasion on the housing covers as well as by an extremely reliable operation. When used for dosaging and/or charging of bulk materials which tend to explode (e.g. coal dust) this gate should also be constructed so as to be as resistant to pressure shocks and as safe against penetration of flames as possible.

SUMMARY OF THE INVENTION

In the rotary vane gate according to the invention a wear plate which is sealed with respect to the housing is disposed between each limiting plate on the two ends of the wheel and the neighbouring housing cover in each case, and between each wear plate and the appertaining limiting plate at least one bypass chamber is constructed. Whereas in this case the axial internal width of the upper inlet opening is at most as large as the axial internal width of the compartments, the axial internal width of the lower outlet opening advantageously corresponds approximately to the axial length of the wheel including the two axial bypass chambers constructed on the end faces. Because of this construction according to the invention leakages occurring between the outer circumference of the wheel and the inner walls of the housing can be extremely advantageously reduced, any bulk material penetrating through the sealing gaps between the outer circumference of the wheel and the housing inner walls into the bypass chambers being led off directly downwards and discharged with the rest of the bulk material through the unrestricted outlet opening available there. In this case the aforementioned sealing gaps act to some extent as leakage throttles. The introduction of pressurised scavenging gas into the bypass chambers can be dispensed with because of the reliable removal downwards of bulk material which has got through.

A particular advantage is also produced by the provision of wear plates which are sealed with respect to the housing and which each to a certain extent constitute an outer boundary wall for the constructed bypass chambers and are advantageously disposed with a relatively small axial spacing from the neighbouring housing covers on the ends. These wear plates can be plates made from suitable material which are relatively simple to produce, to install and optionally to replace. These wear plates ensure that on the one hand the relatively costly housing covers with all their accessories are practically completely protected from wear caused by the bulk material and that on the other hand a relatively high resistance to pressure shocks or safety against penetration of flames can be ensured for the dosaging and/or conveying of free-flowing bulk materials which tend to explode, such as for example coal dust.

According to a particularly advantageous embodiment of the invention the wheel bears on the axially outer face of each limiting plate a plurality of outer vanes which thus revolve jointly with the wheel and extend on the one hand in the axial direction from the appertaining limiting plate as far as the neighbouring wear plate and on the other hand from the drive shaft as far as the outer circumference of the wheel. Thus in this way compartments which rotate with the wheel are provided on the axially outer faces of each limiting plate and thus in each bypass chamber constructed there, and these compartments to a certain extent ensure a gradual pressure reduction of leakages in the region of these bypass chambers and simultaneously also continuously guide any bulk material which has penetrated into these bypass chambers downwards to the outlet opening.

In the last-mentioned construction it is also advantageous if the inner end face of each wear plate is in sliding contact under spring pretension with the end faces of the outer vanes facing it. Thus if any bulk material which tends to cake onto walls is conveyed by the rotary vane gate according to the invention, then because of the sliding contact between the end faces of the outer vanes and the appertaining wear plate on the latter any pieces of bulk material which are freshly caked on can be immediately scraped off again.

THE DRAWINGS

DETAILED DESCRIPTION

Figure 1:
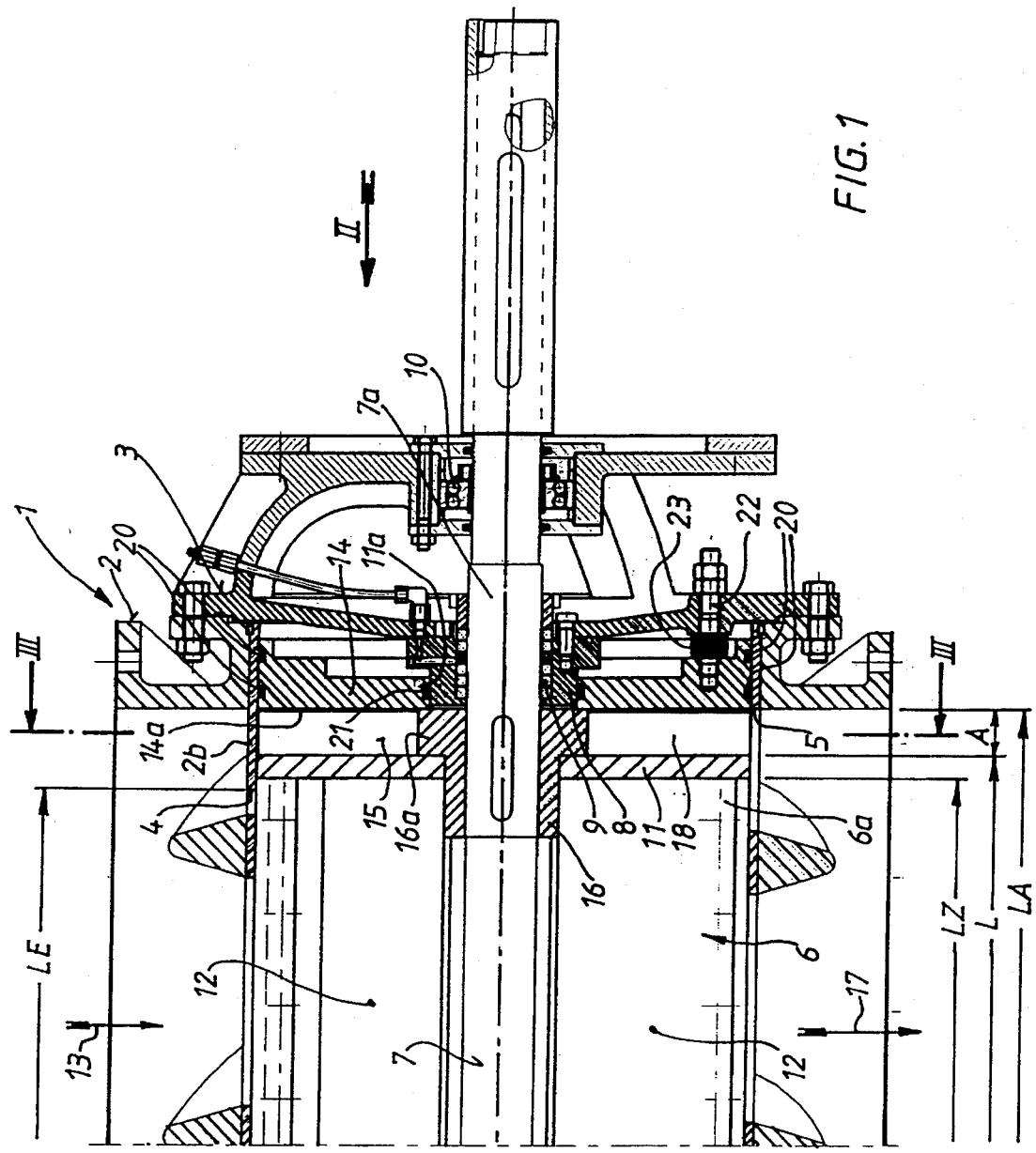
FIG. 1 shows a vertical partial longitudinal sectional view through the rotary vane gate according to the invention.

A first-embodiment of the rotary vane gate 1 according to the invention will be explained with the aid of FIGS. 1 to 3, wherein FIG. 1 merely shows a partial longitudinal sectional view (vertical section) in the region of one end (here the right-hand end), whilst the other end (the left-hand one here) of the rotary vane gate 1 is basically constructed in a similar manner but in mirror image. It may be assumed that this rotary vane gate 1 is intended in particular for dosaging and/or conveying free-flowing bulk materials which tend to explode, such as for example coal dust or the like.

This rotary vane gate 1 comprises a housing 2 with a cylindrical or partially cylindrical inner wall 2a which can be lined with a cylindrical inner shell 2b in the manner shown in the drawing. The housing 2 also has two housing covers 3 on the ends as well as an upper inlet opening 4 and a lower outlet opening 5 for the bulk material to be dosaged or to be conveyed.

A wheel 6 is arranged in the housing 2 so that it can be driven in rotation in the usual way. This wheel 6 is provided non-rotatably with a drive shaft 7, the ends of which, e.g. 7a, are passed outwards through bosses 8 on the cover and are rotatably mounted in the corresponding housing covers 3. In this case there are provided in the stationary cover bosses 8 adjustable stuffing-box packings 9 for sealed passage of the corresponding drive shaft ends 7a and in each case offset outwards axially with respect thereto—likewise in the housing covers 3—suitable bearings 10 (e.g. anti-friction bearings) for these drive shaft ends 7a.

The wheel 6 has in the region of each of its two ends (in FIG. 1 only one end, the right-hand one 6a, is shown) a limiting plate 11 which can be constructed as a substantially flat circular disc with a central bore (for the drive shaft 7 to pass through), these limiting plates being provided in order to delimit compartments 12 which are open towards the outer circumference of the wheel and serve to receive and further convey corresponding quantities of bulk material.

Figure 2:
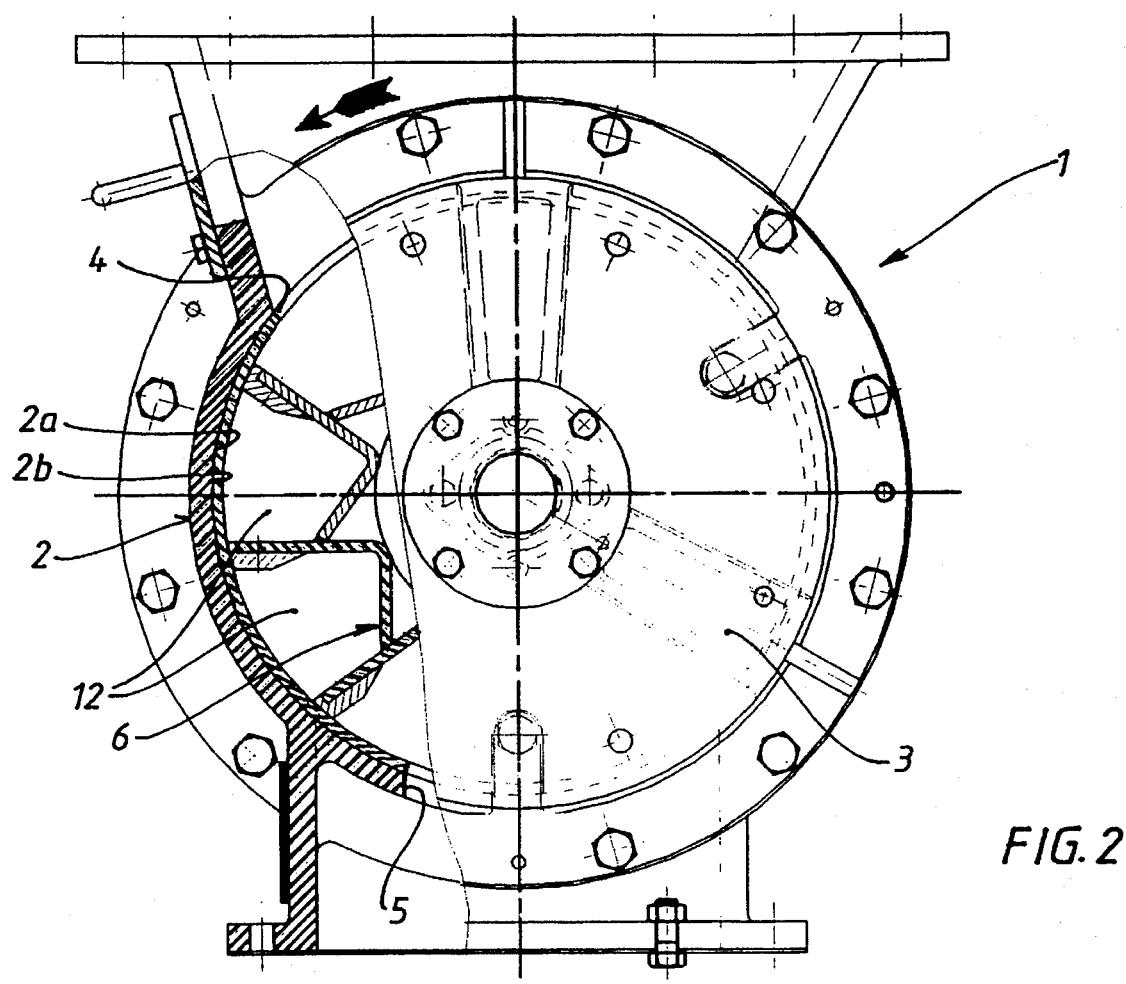
FIG. 2 shows an end view (arrow II in FIG. 1) of the rotary vane gate, with a partial sectional representation in the region of the compartments.

In order that the bulk material delivered from above—according to the arrow 13—to the rotary vane gate and the wheel 6 can be reliably introduced into the individual compartments 12 and does not pass directly into the region axially outside the limiting plates 11, the axial internal width LE of the upper inlet opening 4 is at most as great as the axial internal width LZ of the compartments; in the embodiment according to FIG. 1 the internal width LE of the inlet opening is preferably somewhat smaller than the axial internal width LZ of the compartments.

It is particularly important that a wear plate 14 which is sealed with respect to the housing 2 is disposed between each limiting plate 11 on the two ends of the wheel 6 and the neighbouring housing cover 3 in each case and that at least one bypass chamber 15 is constructed between each wear plate 14 and the appertaining limiting plate 11 (in the example of FIG. 1 only one such bypass chamber is present in the region of each end). Thus each of these bypass chambers 15 is delimited in the axial direction by the limiting plate 11 and the neighbouring wear plate 14 and in the radial direction by the housing inner wall 2a or the inner shell 2b thereof on the one hand and by the drive shaft 7 or—as in FIG. 1—a collar 16 provided thereon, the flange 16a of which simultaneously forms a type of distance piece between the limiting plate 11 an the wear plate 14 (corresponding the particular axial width of the bypass chamber 15).

Furthermore, in the construction described above the axial internal width LA of the outlet opening 5 corresponds approximately to the axial overall length L of the wheel 6 plus (including) all axial dimensions A of the bypass chambers 15. In this way not only the bulk material conveyed into the compartments. 12—according to the arrow 17—can escape freely downwards out of the outlet opening 5 but also any bulk material which may have passed through the sealing gaps between the limiting plates 11 and the sections of the housing wall 2a or of the inner shell 2b which co-operate therewith.

Figure 3:
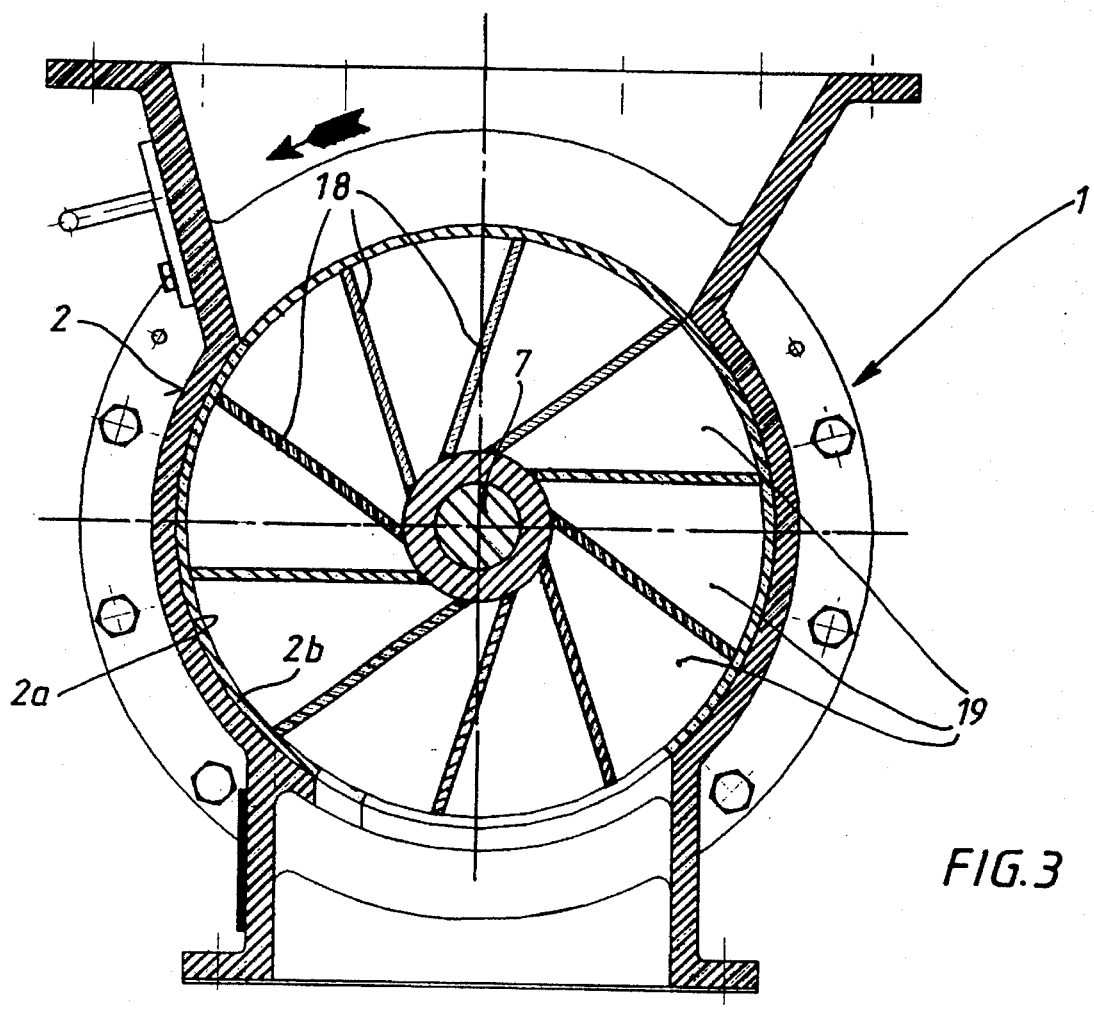
FIG. 3 shows a cross-sectional view, along the line III—III in FIG. 1, through a bypass chamber.

The wheel 6 also bears on the axially outer face of each limiting plate 11 a corresponding number of outer vanes 18 which revolve together with the wheel 6 (that is to say are non-rotatably connected thereto) and can be disposed and distributed approximately according to the representation in FIG. 3. These outer vanes 18 extend on the one hand in the axial direction from the appertaining limiting plate 11 as far as the neighbouring wear plate 14 and on the other hand from the drive shaft 7 or the collar 16 fixed thereon as far as the outer circumference of the Wheel 6. In this way there is likewise produced a corresponding number of compartments (second compartments) 19 which ensure a gradual pressure reduction between the inlet opening 4 and the outlet opening 5 as well as reliable collection and removal of bulk material which has penetrated into the bypass chambers 15.

The outer vanes 18 explained above are guided outwards in the axial direction so far that their free ends are in sliding contact with the inner end face 14a, which is turned towards them, of the appertaining wear plate 14, and this takes place—as will be explained later—under suitable spring pre-tension.

For the arrangement of the wear plates 14 it is also advantageous if each of them lies close on the one hand by way of first static sealing elements (e.g. O rings) 20 with their outer peripheral edge on the cylindrical inner wall 2a or the inner shell 2b thereof of the housing 2 and on the other hand by way of a central bore 14b and at least one second static sealing element 21 disposed therein on the outer face (outer peripheral face) of the appertaining cover boss 8. In this case, however, each wear plate 14 is held by means of a plurality of setscrew arrangements 22 on the neighbouring housing cover 3 in such a way that it can be adjusted in the axial direction relative to the housing cover 3 and the wheel 6. As is also shown schematically in this connection in FIG. 1, each setscrew arrangement 22 can bear, in the region between the housing cover 3 and the wear plate 14, a compression spring or a set of compression springs 23 by means of which the wear plate 14 can be spring-pretensioned in a suitable way against the ends of the outer vanes 18 which face it.

With the aid of FIG. 4, which is similar to FIG. 1, a further embodiment or a variant of the first example will be explained, so that for the sake of simplicity the same components are provided with the same reference numerals as in FIGS. 1 to 3 and thus a repeated explanation of these components is superfluous.

Figure 4:
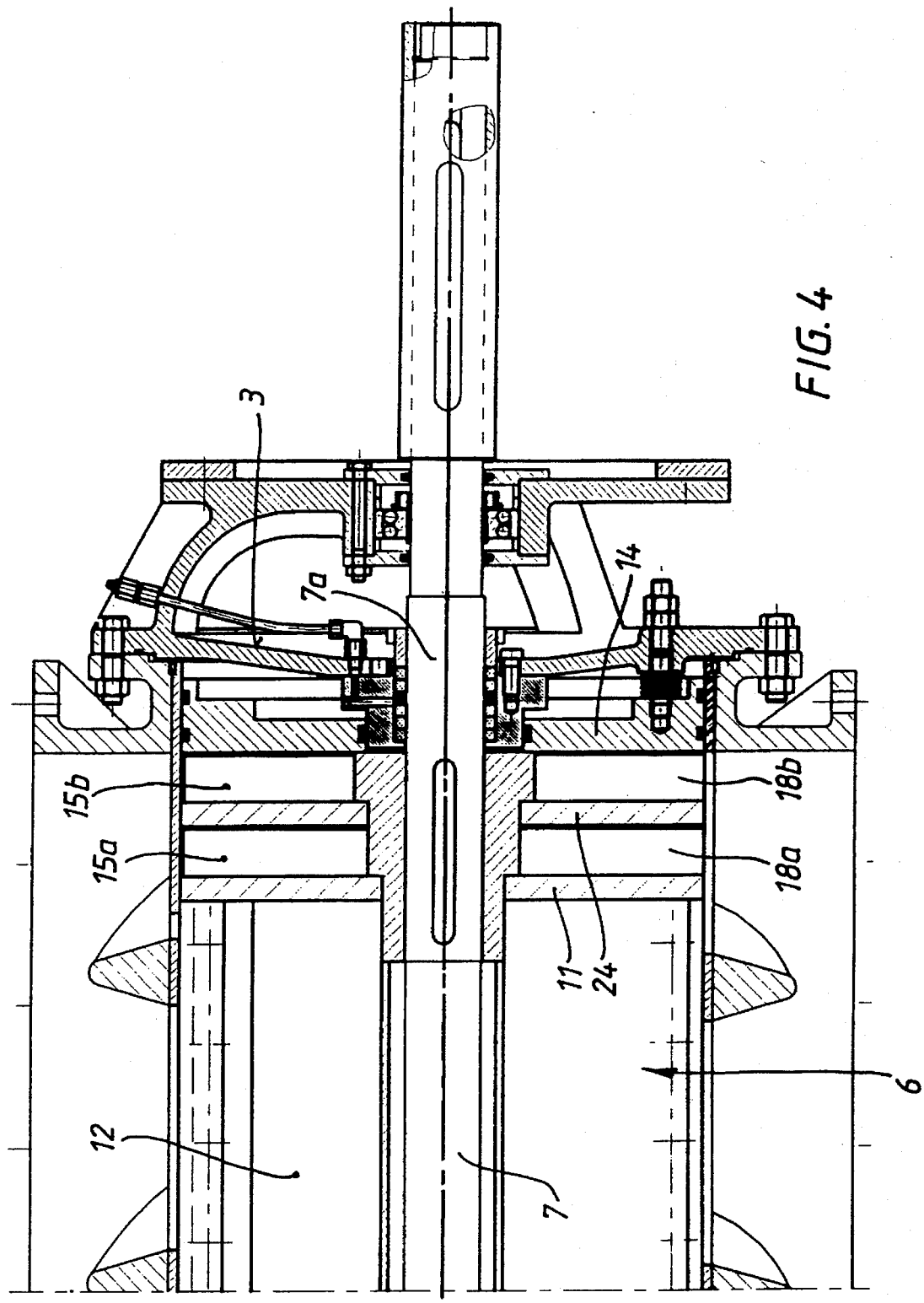
FIG. 4 shows a similar partial longitudinal sectional view to FIG. 1, but in order to explain a variant with two bypass chambers in the region of each end of the wheel.

According to FIG. 4, between each limiting plate 11 of the wheel 6 and the adjacent or neighbouring wear plate 14 an intermediate disc 24 is mounted on the appertaining drive shaft end 7a so as to be fixed against rotation, and this is done in such a way that the space between the limiting plate 11 and the wear plate 14—in contrast to the representation in FIG. 1—is divided into two bypass chamber compartments 15a and 15b. In this case it is advantageous if outer vanes 18a or 18b are disposed in a similar manner to the outer vanes 18 according to FIGS. 1 and 3 in each bypass chamber compartment 15a and 15b and are correspondingly connected so as to be fixed against rotation on the one hand to the wear plate 11 and on the other hand to the intermediate disc 24 (in each case on the outer end face thereof facing the housing cover 3) and also to the appertaining drive shaft end 7a.

Basically the bypass chamber compartments 15, 15a, 15b, which are provided axially outside the compartments 12 which serve for the actual conveying of material, as well as the outer vanes 18, 18a 18b which revolve therein with the wheel 6 ensure in an advantageous manner a gradual pressure reduction between the inlet opening 4 and the outlet opening 5 of this rotary vane gate 1 and also ensure that quantities of bulk material which have entered the bypass chambers are reliably discharged downwards through the outlet opening 5. Moreover, these bypass compartments 15, 15a, 15b as well as the wear plates 14 (with their static sealing elements 20 and which delimit them axially towards the exterior also ensure a reliable seal with respect to the neighbouring housing cover 3 which is disposed with axial spacing from the latter. In the decision as to whether only one single bypass chamber 15 (as in FIG. 1) or at least two bypass compartments 15a, 15b (as in FIG. 4) are to be constructed on the axially outer face of each limiting plate 11, i.e. on each outer end face of the wheel 6, this will by guided by the height of the excess pressure to be expected during operation of the rotary vane gate 1, and above all in an arrangement and construction of at least two bypass chambers on each end face of the wheel a type of extremely reliable labyrinth seal is created. Precisely when this rotary vane gate 1 according to the invention is provided for dosaging and/or conveying bulk material which tends to explode, such as for example coal dust, then a particularly high resistance to pressure shocks or safety against penetration of flames must be ensured at relatively high excess pressures (e.g. up to 13.5 bars). Thus in the gate construction according to the invention this can be achieved by comparatively simple structural measures and with relatively high safety. This safety is further assisted in that in this rotary vane gate according to the invention no clean air or scavenging air is passed through the bypass chambers, which could particularly increase the tendency of such bulk materials to explode.

We claim:

1. In a rotary vane gate construction for use with free-flowing bulk material and comprising:
    (a) a housing having opposite ends, housing covers at the opposite ends, an inlet opening, and an outlet opening,
    (b) a rotatable, compartmentalized wheel within said housing having a drive shaft opposite ends of which are journalled in said housing and extend axially outward thereof through the covers,
    (c) said wheel having at each of its opposite ends a limiting plate forming therebetween compartments which are open radially outward of the wheel,
    (d) said inlet opening having an axial internal width which is at most as great as that of said compartment,
    the improvement comprising:
    (e) a wear plate adjacent each end of said housing and sealed thereto, each said wear plate occupying a position between the cover and the adjacent limiting plate, each said wear plate forming with its adjacent limiting plate a bypass chamber, said axial internal width of each outlet opening corresponding substantially to the combined axial widths of said wheel and each bypass chamber.

2. The construction according the claim 1 wherein each limiting plate has a plurality of outer vanes which revolve conjointly with the wheel and extend axially to the adjacent wear plate and radially to the circumference of the wheel.

3. The construction according to claim 2 wherein each said wear plate has an axially inner face confronting and in sliding contact with the adjacent outer vane.

4. The construction according to claim 3 including spring means urging each said wear plate toward the adjacent outer vane.

5. The construction according to claim 2 including at least one intermediate disc mounted on the drive shaft between adjacent limiting and wear plates and dividing said bypass chamber into a plurality of compartments.

6. The construction according to claim 1 wherein each said wear plate has an outer peripheral wall in engagement with an inner wall of the housing and an inner central bore engaging the adjacent cover, and non-rotatable set screws securing each said wear plate on its adjacent cover to disable rotation and enable axial adjustment of the said cover relative to the housing.

7. The construction according to claim 1 including adjustable stuffing-box packings for sealing the opposite ends of said drive shaft and said bearings.

* * * * *